US 7,638,451 B2

(12) United States Patent
Inoue et al.

(10) Patent No.: US 7,638,451 B2
(45) Date of Patent: Dec. 29, 2009

(54) DIELECTRIC CERAMIC, METHOD OF PRODUCING THE SAME, AND MONOLITHIC CERAMIC CAPACITOR

(75) Inventors: Noriyuki Inoue, Ritto (JP); Toshihiro Okamatsu, Moriyama (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 12/355,706

(22) Filed: Jan. 16, 2009

(65) Prior Publication Data

US 2009/0128990 A1    May 21, 2009

Related U.S. Application Data

(63) Continuation of application No. PCT/JP2007/063294, filed on Jul. 3, 2007.

(30) Foreign Application Priority Data

Jul. 20, 2006    (JP) .............................. 2006-198501

(51) Int. Cl.
    *C04B 35/468*    (2006.01)
(52) U.S. Cl. ..................... 501/138; 501/139; 361/321.4

(58) Field of Classification Search .................. 501/139, 501/138, 137; 361/321.4
See application file for complete search history.

(56) References Cited

FOREIGN PATENT DOCUMENTS

| JP | 06227861 | * | 8/1994 |
| WO | WO-2006025205 | | 3/2006 |

OTHER PUBLICATIONS

International Search Report for PCT/JP2007/063294 dated Aug. 14, 2007.

* cited by examiner

*Primary Examiner*—Karl E Group
(74) *Attorney, Agent, or Firm*—Dickstein, Shapiro, LLP.

(57) ABSTRACT

A dielectric ceramic contains a barium titanate compound oxide as a main component; at least one rare earth element R selected from Y, La, Ce, Pr, Nd, Sm, Eu, Gd, Tb, Dy, Ho, Er, Tm, Yb, and Lu; Mg; and Ni, such that a crystalline compound oxide containing the rare earth element R, Ni, and Ti as main components is present. Dielectric ceramic layers are made of the dielectric ceramic. Accordingly, even when a higher electric field is continuously applied under a high-temperature atmosphere for a long time, high reliability can be ensured.

17 Claims, 1 Drawing Sheet

DIELECTRIC CERAMIC, METHOD OF PRODUCING THE SAME, AND MONOLITHIC CERAMIC CAPACITOR

This is a continuation of application Serial No. PCT/JP2007/063294, filed Apr. 25, 2007.

TECHNICAL FIELD

The present invention relates to a dielectric ceramic, a method of producing the same, and a monolithic ceramic capacitor. More specifically, the present invention relates to a dielectric ceramic suitable for a dielectric material of a monolithic ceramic capacitor having a small size and a large capacitance, a method of producing the same, and a monolithic ceramic capacitor produced using the dielectric ceramic.

BACKGROUND ART

With recent developments in electronics technology, reduction in size and increase in capacitance of monolithic ceramic capacitors have rapidly proceeded.

Outer electrodes are provided at both ends of a ceramic sintered body prepared by alternately laminating dielectric ceramic layers and inner electrode layers, and then firing the resulting laminate in this type of monolithic ceramic capacitor. By reducing the thickness of each of the dielectric ceramic layers and laminating a large number of such dielectric ceramic layers, a reduction in size and an increase in capacitance of the monolithic ceramic capacitor can be realized. However, when the thickness of each of the dielectric ceramic layers is decreased, the electric field applied to the dielectric ceramic layers increases. Accordingly, it is important that reliability under a high-temperature load be ensured. Monolithic ceramic capacitors with improved reliability have been actively developed.

For example, Patent Document 1 proposes a dielectric ceramic composition including main phase particles containing, as a main component, $ABO_3$ (which represents a perovskite crystal wherein the A site contains Ba, or Ba and at least one of Ca and Sr, and the B site contains Ti, or Ti and at least one of Zr and Hf); a rare earth element R (wherein R represents at least one selected from Y, La, Ce, Pr, Nd, Sm, Eu, Gd, Tb, Dy, Ho, Er, Tm, Yb, and Lu); Mg; and Si, and secondary phase particles composed of a crystalline compound oxide containing the rare earth element R and Mg as main components; when some of the Ti of the B site is replaced with Zr, the relationship $0.06 \leq Zr/(Zr+Ti+Hf) \leq 0.40$ is satisfied in terms of moles; and the contents of the rare earth element R, Mg, and Si relative to the content of $ABO_3$ are in the range of 4% to 40%, in the range of 2% to 20%, and in the range of 2% to 15%, respectively, in terms of moles.

According to Patent Document 1, the insulation resistance of the dielectric ceramic composition can be maintained to be 100 kΩ or more, thereby ensuring reliability under a high-temperature load, even when an electric field of 16.6 kV/mm is applied at a high temperature of 125° C. for 1,000 hours, by allowing the secondary phase particles composed of the crystalline compound oxide containing the rare earth element R and Mg as main components to be present in the dielectric ceramic composition.

Patent Document 1: PCT Publication No. WO06/025205 pamphlet

DISCLOSURE OF INVENTION

Problems to be Solved by the Invention

According to Patent Document 1, a satisfactory high-temperature load lifetime can be achieved even when an electric field of 16.6 kV/mm is applied. However, a further reduction in the thickness of layers and increase in the number of layers have been required recently, and thus, a monolithic ceramic capacitor having high reliability has been desired in which even when a higher electric field is continuously applied under a high-temperature atmosphere for a long time, and malfunction does not occur.

The present invention has been conceived in view of the above situation, and it is an object of the present invention to provide a monolithic ceramic wherein when a higher electric field is continuously applied under a high-temperature atmosphere for a long time, high reliability can be ensured, a method of producing the same, and a monolithic ceramic capacitor produced using the dielectric ceramic.

Means for Solving the Problems

The inventors of the present invention have conducted intensive studies in order to achieve the above object, and found that in a dielectric ceramic containing, as a main component, a barium titanate compound oxide having a perovskite structure, by allowing an R—Ni—Ti—O crystalline compound oxide containing a rare earth element R, nickel (Ni), and titanium (Ti) as main components to be present in the dielectric ceramic as secondary phase particles, a decrease in the insulation resistance can be minimized even when a high electric field of 20 kV/mm is continuously applied for a long time, and thereby, a dielectric ceramic having a reliability higher than that of existing dielectric ceramics can be obtained.

The present invention has been made on the basis of the above finding. A dielectric ceramic according to the present invention contains a barium titanate compound oxide as a main component; at least one rare earth element R selected from the group consisting of Y, La, Ce, Pr, Nd, Sm, Eu, Gd, Tb, Dy, Ho, Er, Tm, Yb, and Lu; Mg; and Ni, wherein a crystalline compound oxide containing the rare earth element R, Ni, and Ti as main components is present.

In the present invention, the term "crystalline compound oxide" means a particulate phase that satisfies all the conditions that, based on the total amount of metal elements, the molar content of the rare earth element R is 8 mole percent or more, the molar content of Ni is 8 mole percent or more, the molar content of Ti is 8 mole percent or more, and the total molar content of the rare earth element R, Ni, and Ti is 50 mole percent or more.

In addition, as a result of more intensive studies, the inventors of the present invention found that, it is necessary that the molar ratio Ni/R of the content of Ni to the content of the rare earth element R be at least more than 0.15, and preferably more than 0.35, in order to obtain a desired crystalline compound oxide, and furthermore, it is more preferable that the crystalline compound oxide be represented by a composition formula $R_2NiTiO_6$.

Specifically, the ratio Ni/R of the molar content of Ni to the molar content of the rare earth element R in the crystalline compound oxide satisfies the relationship Ni/R>0.15 in the dielectric ceramic of the present invention.

In the dielectric ceramic of the present invention, the ratio Ni/R preferably satisfies the relationship Ni/R>0.35.

Furthermore, in the dielectric ceramic of the present invention, the crystalline compound oxide is preferably represented by a composition formula $R_2NiTiO_6$.

In the present invention, Mg is contained as an essential component in the dielectric ceramic from the standpoint of exhibiting electrical characteristics. Some of the Ni may be replaced with Mg during firing, and the Mg may be contained in the crystalline compound oxide in some cases.

However, as a result of studies carried out by the inventors of the present invention, it was found that even when Mg is contained in the crystalline compound oxide, reliability is hardly affected as long as the molar content of the Mg is a predetermined amount or less. More specifically, when the content of Mg is evaluated in terms of the ratio Ni/(Ni+Mg) of the molar content of Ni to the total molar content of Ni and Mg, and when the ratio Ni/(Ni+Mg) is at least 0.3 or more, preferably 0.7 or more, the dielectric ceramic can have satisfactory reliability in terms of practical use.

More specifically, the crystalline compound oxide contains Mg, and the ratio Ni/(Ni+Mg) of the molar content of Ni to the total molar content of Ni and Mg satisfies the relationship Ni/(Ni+Mg)≧0.3 in the dielectric ceramic of the present invention.

In the dielectric ceramic of the present invention, the ratio Ni/(Ni+Mg) preferably satisfies the relationship Ni/(Ni+Mg) ≧0.7.

Furthermore, in the dielectric ceramic of the present invention, the crystalline compound oxide is represented by a composition formula $R_2(Ni, Mg)TiO_6$.

The above-described dielectric ceramic can be produced as follows. A heat-treated powder is prepared in advance by mixing at least a rare earth compound and a nickel compound, and as required, a titanium compound, and performing a heat treatment. The heat-treated powder is mixed with a main component powder and additive substances such as a magnesium compound, a forming process is performed, and a firing process is then performed.

More specifically, a method of producing a dielectric ceramic according to the present invention includes a main component powder preparation step of preparing a main component powder made of a barium titanate compound oxide using ceramic primary raw materials containing at least a barium compound and a titanium compound as starting materials; a heat-treated powder preparation step of preparing a heat-treated powder by weighing predetermined amounts of a rare earth compound containing at least one rare earth element R selected from the group consisting of Y, La, Ce, Pr, Nd, Sm, Eu, Gd, Tb, Dy, Ho, Er, Tm, Yb, and Lu, and a nickel compound, and then performing a heat treatment; and a firing step in which at least the main component powder, the heat-treated powder, and a magnesium compound are mixed, a forming process is performed, and then a firing process is performed.

Furthermore, in addition to the rare earth compound and the nickel compound, a predetermined amount of a titanium compound is weighed, and the heat treatment is then performed in the heat-treated powder preparation step in the method of producing the dielectric ceramic of the present invention.

A monolithic ceramic capacitor according to the present invention includes a ceramic sintered body prepared by alternately laminating dielectric ceramic layers and inner electrode layers, and firing the resulting laminate; and outer electrodes disposed at both ends of the ceramic sintered body, wherein the dielectric ceramic layers are made of the above-described dielectric ceramic.

Advantages

According to the above-described dielectric ceramic, in a dielectric ceramic containing a barium titanate compound oxide as a main component; at least one rare earth element R selected from the group consisting of Y, La, Ce, Pr, Nd, Sm, Eu, Gd, Tb, Dy, Ho, Er, Tm, Yb, and Lu; Mg; and Ni, a crystalline compound oxide containing the rare earth element R, Ni, and Ti as main components is present. Accordingly, even when an electric field higher than before is applied under a high-temperature atmosphere for a long time, occurrence of malfunctions can be minimized, and a dielectric ceramic having high reliability can be obtained.

More specifically, a crystalline compound oxide in which the ratio Ni/R of the molar content of Ni to the molar content of the rare earth element R in the above-described crystalline compound oxide satisfies the relationship Ni/R>0.15 (preferably Ni/R>0.35) and which is more preferably represented by $R_2NiTiO_6$ is present in the dielectric ceramic. Thereby, the above operation and advantage can be easily achieved.

In addition, the ratio Ni/(Ni+Mg) of the molar content of Ni to the total molar content of Ni and Mg satisfies the relationship Ni/(Ni+Mg)≧0.3 (preferably Ni/(Ni+Mg)≧0.7). Accordingly, even when some of the Ni in the crystalline compound oxide is replaced with Mg, reliability in a high-temperature load is not hardly affected. Accordingly, a dielectric ceramic having high reliability can be obtained.

A method of producing a dielectric ceramic of the present invention includes a main component powder preparation step of preparing a main component powder made of a barium titanate compound oxide using ceramic primary raw materials containing at least a barium compound and a titanium compound as starting materials; a heat-treated powder preparation step of preparing a heat-treated powder by weighing predetermined amounts of a rare earth compound containing at least one rare earth element R selected from the group consisting of Y, La, Ce, Pr, Nd, Sm, Eu, Gd, Tb, Dy, Ho, Er, Tm, Yb, and Lu, and a nickel compound, and then performing a heat treatment; and a firing step in which at least the main component powder, the heat-treated powder, and a magnesium compound are mixed, a forming process is performed, and then a firing process is performed. Accordingly, the heat-treated powder is mixed with the main component powder, and some of Ti in a main component reacts with the heat-treated powder to form a crystalline compound oxide. Thereby, the above-described dielectric ceramic can be easily produced.

In the heat-treated powder preparation step, a predetermined amount of a titanium compound may be weighed, in addition to the rare earth compound and the nickel compound, and the heat treatment may then be performed. This process can also easily form a desired crystalline compound oxide in the dielectric ceramic.

According to a monolithic ceramic capacitor of the present invention including a laminated sintered body prepared by alternately laminating dielectric ceramic layers and inner electrode layers, and firing the resulting laminate; and outer electrodes disposed at both ends of the laminated sintered body, the dielectric ceramic layers are made of the dielectric ceramic described above. Accordingly, a monolithic ceramic capacitor having high reliability can be obtained. Specifically, even when a high electric field of 20 kV/mm is continuously applied for 1,000 hours, the generation rate of defects can be reduced to 5% or less. Accordingly, a compact monolithic ceramic capacitor including dielectric ceramic layers having a small thickness and having a large capacitance and excellent reliability can be obtained.

REFERENCE NUMERALS 1a to 1g dielectric ceramic layer
2a to 2f inner electrode layer
3 outer electrode
10 ceramic sintered body

BEST MODES FOR CARRYING OUT THE INVENTION

Next, embodiments of the present invention will be described in detail.

A dielectric ceramic of an embodiment of the present invention contains a barium titanate compound oxide as a main component, a rare earth element R, Mg, and Ni, wherein a crystalline compound oxide containing the rare earth element R, Ni, and Ti as main components is formed as secondary phase particles.

Here, as the rare earth element R, at least one type of element selected from the group consisting of Y, La, Ce, Pr, Nd, Sm, Eu, Gd, Tb, Dy, Ho, Er, Tm, Yb, and Lu can be used.

The barium titanate compound oxide has a perovskite structure represented by a general formula $ABO_3$. Specific forms thereof include $BaTiO_3$ in which the A site is composed of Ba and the B site is composed of Ti; $(Ba, Ca)TiO_3$, $(Ba, Sr)TiO_3$, and $(Ba, Ca, Sr)TiO_3$ in which some of the Ba is replaced with at least one type of element selected from Ca and Sr; $Ba(Ti, Zr)O_3$, $Ba(Ti, Hf)O_3$, and $Ba(Ti, Zr, Hf)O_3$ in which some of the Ti is replaced with at least one type of element selected from Zn and Hf; and combinations thereof. Although the mixing molar ratio A/B of the A site to the B site is stoichiometrically 1.000, the composition is determined so that there is an excess of the A site or an excess of the B site, according to need, to the extent that various properties, the sinterability, and the like are not affected.

In this embodiment, a crystalline compound oxide containing the rare earth element R, Ni, and Ti as main components is present in the dielectric ceramic as secondary phase particles. Consequently, even when a high electric field (for example, 20 kV/mm) is continuously applied under a high-temperature atmosphere for a long time (for example, 1,000 hours), the decrease in the insulating property can be minimized. Accordingly, even when the thickness of dielectric ceramic layers is further reduced, desired reliability can be ensured.

In this embodiment, a particulate phase in which, based on the total amount of metal elements, the molar content of the rare earth element is 8 mole percent or more, the molar content of Ni is 8 mole percent or more, the molar content of Ti is 8 mole percent or more, and the total molar content of Dy, Ni, and Ti is 50 mole percent or more is considered to be the presence of an R—Ni—Ti—O crystalline compound oxide.

The composition is determined so that the molar ratio Ni/R of the content of Ni to the content of the rare earth element R in the crystalline compound oxide satisfies the relationship Ni/R>0.15. When the molar ratio Ni/R is 0.15 or less, it is difficult to obtain a desired R—Ni—Ti—O crystalline compound oxide having the above-described particulate phase. In order to ensure higher reliability, the molar ratio Ni/R preferably satisfies the relationship Ni/R>0.35. Furthermore, more preferably, the molar ratio Ni/R is 0.5, that is, the crystalline compound oxide is represented by a composition formula $R_2NiTiO_6$.

In the above dielectric ceramic, Mg is contained as an essential component from the standpoint of exhibiting electrical characteristics. Some of the Ni may be replaced with Mg during firing, and the Mg may be contained in the crystalline compound oxide in some cases. Even in such a case, the reliability is hardly affected as long as the molar content of the Mg in the crystalline compound oxide is a predetermined amount or less. More specifically, in the case where the content of Mg is evaluated in terms of the molar ratio Ni/(Ni+Mg) of the content of Ni to the total content of Ni and Mg, even when a small amount of Mg that substantially satisfies the relationship Ni/(Ni+Mg)≧0.3 is contained, reliability is hardly affected. When the relationship of molar ratio Ni/(Ni+Mg)≧0.7 is satisfied, reliability substantially the same as that in the case where Mg is not contained in the crystalline compound oxide can be ensured, and thus higher reliability can be ensured.

In this case, since some of the Ni is replaced with Mg, the crystalline compound oxide is preferably represented by a composition formula $R_2(Ni, Mg)TiO_6$.

As described above, a rare earth element R, Mg, and Ni are contained in the dielectric ceramic. These elements can be present in various types of forms. For example, the elements may be present as components constituting the crystalline compound oxide. Alternatively, the elements may be present as a solid solution in the main component, or the elements may be segregated in crystal grain boundaries or crystalline triple points.

In addition, as described above, the crystalline compound oxide is present in the dielectric ceramic as secondary phase particles. The presence ratio thereof is not particularly limited, but is preferably 0.3% or more in terms of an area ratio in an observation of an arbitrary cross section.

Figure 1:
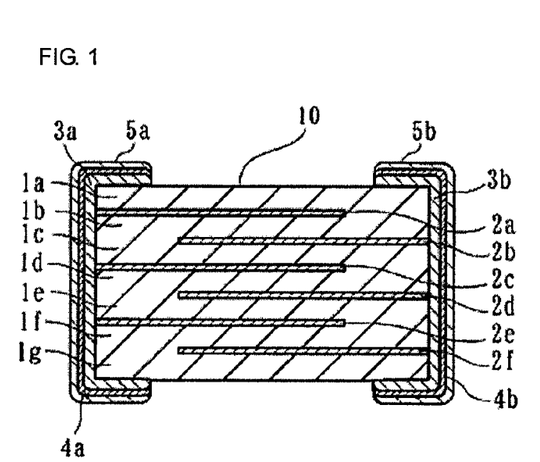
FIG. 1 is a cross-sectional view showing an embodiment of a monolithic ceramic capacitor produced using a dielectric ceramic of the present invention.

FIG. 1 is a cross-sectional view that schematically shows an embodiment of a monolithic ceramic capacitor produced using a dielectric ceramic of the present invention.

In the monolithic ceramic capacitor, inner electrodes 2a to 2f are embedded in a ceramic sintered body 10, outer electrodes 3a and 3b are provided at both ends of the ceramic sintered body 10, first plated coating films 4a and 4b and second plated coating films 5a and 5b are provided on the surfaces of the outer electrodes 3a and 3b.

More specifically, the ceramic sintered body 10 is prepared by alternately laminating dielectric ceramic layers 1a to 1g made of a dielectric ceramic of the present invention and inner electrode layers 2a to 2f, and firing the resulting laminate. The inner electrode layers 2a, 2c, and 2e are electrically connected to the outer electrode 3a, and the inner electrode layers 2b, 2d, and 2f are electrically connected to the outer electrode 3b. An electrostatic capacitance is formed between a surface of each of the inner electrode layers 2a, 2c, and 2e and a surface of each of the inner electrode layers 2b, 2d, and 2f, the surfaces facing each other.

Next, a method of producing the above monolithic ceramic capacitor will be described in detail.

First, a barium compound and a titanium compound are prepared, and if necessary, a calcium compound, a strontium compound, a zirconium compound, a hafnium compound, and the like are prepared as ceramic primary raw materials. Predetermined amounts of these ceramic primary raw materials are weighed, and the weighed primary raw materials are charged in a ball mill together with grinding media such as partially stabilized zirconia (PSZ) balls and purified water. The primary raw materials are sufficiently mixed and ground by a wet process, and then dried. Subsequently, the resulting powder is calcined at a temperature in the range of 950° C. to 1,150° C. for a predetermined time. Thereby, a main component powder made of a barium titanate compound oxide having an average particle diameter in the range of 0.1 to 0.2 μm is prepared.

Next, a rare earth compound containing a rare earth element R (at least one element selected from Y, La, Ce, Pr, Nd, Sm, Eu, Gd, Tb, Dy, Ho, Er, Tm, Yb, and Lu) and a nickel compound are prepared. The rare earth compound and the nickel compound are weighed such that the molar ratio Ni/R satisfies the relationship Ni/R>0.15, preferably 0.35<Ni/R≦0.50, and mixed. A heat treatment is performed at a temperature in the range of 500° C. to 1,200° C. to prepare a crystalline oxide powder (heat-treated powder) containing R and Ni.

After the crystalline oxide powder is disintegrated, the main component powder and the crystalline oxide powder are weighed such that the amount of crystalline oxide powder is in the range of 0.5 to 20 parts by mole in terms of R relative to 100 parts by mole of the main component powder. The weighed powders are charged in a ball mill together with grinding media and purified water. The powders are sufficiently mixed and ground by a wet process, then dried to obtain a ceramic raw material.

Note that this ceramic raw material is subjected to a firing process in a process of producing a monolithic ceramic capacitor, as described below, to form a dielectric ceramic of the present invention.

Next, the above ceramic raw material is charged in a ball mill together with an organic binder, an organic solvent, and grinding media and mixed by a wet process to prepare a ceramic slurry. The ceramic slurry is formed by a doctor blade method or the like, thus preparing ceramic green sheets having a thickness of about 3 μm or less.

Subsequently, screen printing is performed on the ceramic green sheets using a conductive paste for an inner electrode to form a conductive film having a predetermined pattern on the surfaces of the ceramic green sheets.

The conductive material contained in the conductive paste for an inner electrode is not particularly limited, but a base metal material containing Ni, Cu, or an alloy thereof as a main component is preferably used from the standpoint of a reduction in cost.

Next, a plurality of ceramic green sheets each having the conductive film thereon are laminated in a predetermined direction, and the resulting laminate is sandwiched with ceramic green sheets not having a conductive film. The laminate is pressure-bonded and cut to predetermined dimensions, thus allowing a ceramic laminate to be prepared. Subsequently, a debinding process is performed at a temperature in the range of 300° C. to 500° C. Furthermore, a firing process is performed at a temperature in the range of 1,100° C. to 1,300° C. for about two hours under a reducing atmosphere of a $H_2$—$N_2$—$H_2O$ gas in which the oxygen partial pressure is controlled to be in the range of $10^{-9}$ to $10^{-12}$ MPa. Accordingly, the conductive film and the ceramic material are co-sintered, and thus a ceramic sintered body 10 in which inner electrodes 2a to 2f are embedded is obtained.

Next, a conductive paste for an outer electrode is applied to both end surfaces of the ceramic sintered body 10. A baking process is performed at a temperature in the range of 600° C. to 800° C. to form outer electrodes 3a and 3b.

The conductive material contained in the conductive paste for an outer electrode is also not particularly limited, but a material containing Ag, Cu, or an alloy thereof as a main component is preferably used from the standpoint of a reduction in cost.

Regarding the method of forming the outer electrodes 3a and 3b, after the conductive paste for an outer electrode is applied to both end surfaces of the ceramic laminate, a baking process of the conductive paste a firing process of the ceramic laminate may be performed at the same time.

Finally, first electrolytic plated coating films 4a and 4b made of Ni, Cu, a Ni—Cu alloy, or the like are formed on the surfaces of the outer electrodes 3a and 3b, and second electrolytic plated coating films 5a and 5b made of solder, tin, or the like are further formed on the surfaces of the first plated coating films 4a and 4b, respectively. Thereby, a monolithic ceramic capacitor is produced.

As described above, this monolithic ceramic capacitor is produced using the above-described dielectric ceramic. Even when a high electric field is applied for a long time under a high-temperature atmosphere, a decrease in the insulating property can be suppressed, occurrence of a malfunction can be minimized, and a monolithic ceramic capacitor having high reliability can be easily obtained in a monolithic ceramic capacitor including dielectric ceramic layers 1a to 1g having a smaller thickness.

Note that the present invention is not limited to the above embodiment. For example, in the above embodiment, a crystalline oxide powder (heat-treated powder) containing a rare earth element R and Ni is prepared in advance, the crystalline oxide powder and a powder of a main component are mixed, and Ti in the main component is allowed to be present in the crystalline oxide powder in the form of a solid solution in the firing process to prepare an R—Ni—Ti—O crystalline compound oxide. Alternatively, a compound oxide powder containing Ti in addition to a rare earth element R and Ni may be prepared in advance, and the compound oxide powder may be added to a main component to prepare a ceramic raw material.

The above embodiment does not mention additive components other than the rare earth element R, Mg, and Ni. However, from the standpoint of various characteristics such as electrical characteristics and an improvement in reliability, it is also preferable that, for example, MgO, MnO, $SiO_2$, and CuO be contained as additives according to need.

Furthermore, the ceramic primary raw materials such as a barium compound and a titanium compound, for example, a carbonate, an oxide, a nitrate, a hydroxide, an organic acid salt, an alkoxide, or a chelate compound can be appropriately selected in accordance with the form of synthesis reaction.

In the process of producing a monolithic ceramic capacitor described above, Al, Sr, Zr, Fe, Hf, Na, Co, and other elements may be mixed as an impurity and present in the crystal grains or crystal grain boundaries. However, these elements do not affect electrical characteristics of the capacitor.

An inner electrode component may diffuse in crystal grains or crystal grain boundaries during the firing process of the monolithic ceramic capacitor. However, also in this case, electrical characteristics of the capacitor are not affected.

Next, Examples of the present invention will be described specifically.

EXAMPLE 1

First, as ceramic primary raw materials, predetermined amounts of $BaCO_3$ and $TiO_2$ were weighed, and the weighed primary raw materials were charged in a ball mill together with PSZ balls and purified water. The primary raw materials were sufficiently mixed and ground by a wet process, and then dried. Subsequently, the resulting powder was calcined at a temperature of 1,100° C. for about two hours. Thereby, a main component powder made of $Ba_{1.01}TiO_3$ having an average particle diameter of 0.15 μm was prepared.

Next, as a rare earth compound containing a rare earth element R, $Dy_2O_3$ was prepared, and furthermore, NiO was prepared. Subsequently, $Dy_2O_3$ and NiO were weighed such that the molar ratio Ni/Dy of Ni to Dy were the values shown in Table 1, and mixed. A heat treatment was performed at a temperature of 1,000° C. for two hours to prepare a Dy—Ni—O oxide powder.

Subsequently, as additive powders, MgO, MnO, and $SiO_2$ were prepared. The main component powder, the oxide powder, and the additive powders were weighed such that the amount of oxide powder was 1 part by mole in terms of Dy, the amount of MgO was 1.5 parts by mole, the amount of MnO was 0.2 parts by mole, and the amount of $SiO_2$ was 1.5 parts by mole relative to 100 parts by mole of the main component powder. The weighed powders were then charged in a ball mill together with PSZ balls and purified water. The powders were sufficiently mixed and ground by a wet process, and then dried to obtain a ceramic raw material.

Next, the above ceramic raw material was charged in a ball mill together with ethanol, a polyvinyl butyral binder, and PSZ balls and mixed by a wet process to prepare a ceramic slurry. The ceramic slurry was formed by a doctor blade method into ceramic green sheets having a thickness of either 3 μm or 2.4 μm.

Subsequently, screen printing was performed on the ceramic green sheets using a conductive paste for an inner electrode containing a Ni powder to form a conductive film having a predetermined pattern on the surfaces of the ceramic green sheets.

Next, a predetermined number of ceramic green sheets each having the conductive film thereon were laminated, and the resulting laminate was sandwiched with ceramic green sheets not having a conductive film. The laminate was pressure-bonded and cut to predetermined dimensions, thus allowing a ceramic laminate to be prepared. Subsequently, a debinding process was performed at a temperature of 350° C. under a nitrogen atmosphere. Furthermore, a firing process was performed at a temperature of 1,200° C. for about three hours under a reducing atmosphere of a $H_2$—$N_2$—$H_2O$ gas in which the oxygen partial pressure was controlled to be $10^{-10}$ MPa. Accordingly, the conductive film and the ceramic material were co-sintered, and thus a ceramic sintered body in which inner electrodes were embedded was prepared.

Next, a conductive paste for an outer electrode containing a Cu powder and a glass frit was applied to both end surfaces of the ceramic sintered body. A baking process was performed at a temperature of 700° C. under a nitrogen atmosphere to form outer electrodes. Sample Nos. 1 to 7 were prepared.

The dielectric ceramic layers of the prepared samples had two thicknesses, namely, 2.0 μm and 1.6 μm. Regarding the outline dimensions of the two types of prepared samples, the length was 3.2 mm, the width was 1.6 mm, and the thickness was 0.9 mm, the area of a counter electrode per dielectric ceramic layer was 2.1 $mm^2$, and the effective number of laminated layers was 200 layers.

Next, for each of Sample Nos. 1 to 7, a fracture surface was polished, and observed with a field-emission scanning electron microscope (FE-SEM). A mapping analysis of the composition of each of the above samples was performed with a wavelength dispersive X-ray microanalyzer (WDX) to identify the crystalline compound oxide. Furthermore, the molar ratio Ni/(Ni+Mg) of Ni to the total of Ni and Mg was calculated.

Regarding the identification of the crystalline compound oxide, the presence of a particulate phase satisfying a molar content of Dy of 8 mole percent or more, a molar content of Ni of 8 mole percent or more, a molar content of Ti of 8 mole percent or more, and a total molar content of Dy, Ni, and Ti of 50 mole percent or more determines that a crystalline compound oxide was formed.

The molar ratio Ni/(Ni+Mg) was determined by analyzing three arbitrary points of the crystalline compound oxide, and calculating the average of the analysis results.

Next, a high-temperature load test was performed by applying a voltage of 32 V at a temperature of 125° C. for 1,000 hours (at an electric field strength of 16 kV/mm in the case of the thickness of 2.0 μm, and an electric field strength of 20 kV/mm in the case of the thickness of 1.6 μm) to the two types of samples, and more specifically, 100 samples including dielectric ceramic layers each having a thickness of 2.0 μm and 100 samples including dielectric ceramic layers each having a thickness of 1.6 μm. Samples whose insulation resistance was decreased to 100 kΩ or less were determined to be defective, and the generation rate of defects was determined.

Table 1 shows the composition of the main component, the molar ratio Ni/Dy, the presence or absence of a crystalline compound oxide, the molar ratio Ni/(Ni+Mg), and the measurement results of the high-temperature load test of Sample Nos. 1 to 7.

TABLE 1

| | Composition of main component: $Ba_{1.01}TiO_3$ | | | High-temperature load test: Generation rate of defects (%) | |
|---|---|---|---|---|---|
| Sample No. | Molar ratio Ni/Dy (—) | Presence or absence of crystalline compound oxide | Molar ratio Ni/(Ni + Mg) (—) | Electric field strength: 16 kV/mm | Electric field strength: 20 kV/mm |
| 1* | 0.05 | Absent | — | 14 | 62 |
| 2* | 0.15 | Absent | — | 7 | 38 |
| 3 | 0.25 | Present | 0.3 | 0 | 4 |
| 4 | 0.35 | Present | 0.5 | 0 | 3 |
| 5 | 0.40 | Present | 0.7 | 0 | 0 |
| 6 | 0.45 | Present | 0.8 | 0 | 0 |
| 7 | 0.50 | Present | 1.0 | 0 | 0 |

Symbol * represents that the sample is out of the range of the present invention.

In Sample No. 1, the molar ratio Ni/Dy was 0.05, so that the molar content of Ni to Dy was too low. Therefore, the presence of a Dy—Ni—Ti—O crystalline compound oxide was not observed. The generation rate of defects was 14% at an electric field strength of 16 kV/mm, and the generation rate of defects was 62% at an electric field strength of 20 kV/mm. It was found that reliability was poor.

In Sample No. 2, the molar ratio Ni/Dy was 0.15, and the molar content of Ni to Dy was thus low. Therefore, the presence of a Dy—Ni—Ti—O crystalline compound oxide was not observed. The generation rate of defects was 7% at an electric field strength of 16 kV/mm, and the generation rate of defects was 38% at an electric field strength of 20 kV/mm. Reliability of Sample No. 2 was somewhat improved as compared with Sample No. 1. However, it was found that satisfactory reliability could not be achieved.

In Sample Nos. 3 to 7, the molar ratio Ni/Dy was in the range of 0.25 to 0.50, which exceeded 0.15, and the molar ratio Ni/(Ni+Mg) was 0.3 or more. Therefore, the presence of a Dy—Ni—Ti—O crystalline compound oxide was observed. As a result, the generation rate of defects was 0% at an electric field strength of 16 kV/mm, and the generation rate of defects was decreased to 4% or less, i.e., to the extent that it did not affect practical utility, even at an electric field strength of 20 kV/mm. It was found that reliability was markedly improved.

In particular, the molar ratio Ni/Dy was in the range of 0.40 to 0.50, which exceeded 0.35, and the molar ratio Ni/(Ni+Mg) was 0.7 or more in Sample Nos. 5 to 7. Accordingly, the generation rate of defects was 0% even when a high electric field of 20 kV/mm was applied. It was found that a monolithic ceramic capacitor which can have high reliability even when the thickness of dielectric ceramic layers is reduced could be obtained.

Note that as the molar ratio Ni/R increased, the molar ratio Ni/(Ni+Mg) also increased. The reason for this is as follows. Since Mg is present by replacing some of the Ni, as the molar ratio Ni/R increases to increase the ratio of Ni in the crystalline compound oxide, the molar content of Mg relatively decreases. As is apparent form Sample Nos. 1 to 7, it was confirmed that the molar content of Mg in the crystalline compound oxide was preferably low in view of reliability.

EXAMPLE 2

Sample Nos. 11 to 15 were prepared by methods described below.

Sample No. 11

First, a main component powder made of $Ba_{1.01}TiO_3$ was prepared by the same method and procedure as in EXAMPLE 1.

Next, as a rare earth compound containing a rare earth element R, $Nd_2O_3$ was prepared, and furthermore, NiO was prepared. Subsequently, predetermined amounts of $Nd_2O_3$ and NiO were weighed such that the ratio Nd:Ni was 1:0.25, and mixed. A heat treatment was performed at a temperature of 1,000° C. for two hours to prepare a Nd—Ni—O oxide powder.

Subsequently, as additive powders, NiO, MgO, MnO, $SiO_2$, and CuO were prepared. After the above oxide powder was disintegrated, the main component powder, the crystalline oxide powder, and the additive powders were weighed such that the amount of oxide powder was 4 parts by mole in terms of Nd, the amount of NiO was 1 part by mole, the amount of MgO was 3 parts by mole, the amount of MnO was 0.5 parts by mole, the amount of $SiO_2$ was 2 parts by mole, and the amount of CuO was 0.2 parts by mole relative to 100 parts by mole of the main component powder. The weighed powders were then charged in a ball mill together with PSZ balls and purified water. The powders were sufficiently mixed and ground by a wet process, and then dried to obtain a ceramic raw material.

Thereafter, two types of samples including dielectric ceramic layers having a thickness of 2.0 μm or 1.6 μm were prepared by the same method and procedure as in EXAMPLE 1. The outline dimensions, the area of a counter electrode per dielectric ceramic layer, and the effective number of laminated layers were the same as those in EXAMPLE 1.

Sample No. 12

First, a main component powder made of $Ba_{1.01}TiO_3$ was prepared by the same method and procedure as in EXAMPLE 1.

Next, $Nd_2O_3$, NiO, and $TiO_2$ were prepared. Subsequently, predetermined amounts of these compounds were weighed such that the ratio Nd:Ni:Ti was 1:0.5:0.5, and mixed. A heat treatment was performed at a temperature of 1,000° C. for two hours to prepare a Nd—Ni—Ti—O oxide powder.

Subsequently, MgO, MnO, $SiO_2$, CuO, and $BaCO_3$ were prepared as additive powders. After the above oxide powder was disintegrated, the main component powder, the oxide powder, and the additive powders were weighed such that the amount of oxide powder was 4 parts by mole, the amount of MgO was 3 parts by mole, the amount of MnO was 0.5 parts by mole, the amount of $SiO_2$ was 2 parts by mole, the amount of CuO was 0.2 parts by mole, and the amount of $BaCO_3$ was 2 parts by mole relative to 100 parts by mole of the main component powder. The weighed powders were then charged in a ball mill together with PSZ balls and purified water. The powders were sufficiently mixed and ground by a wet process, and then dried to obtain a ceramic raw material.

Thereafter, two types of samples including dielectric ceramic layers having a thickness of 2.0 μm or 1.6 μm were prepared by the same method and procedure as in EXAMPLE 1. The outline dimensions, the area of a counter electrode per dielectric ceramic layer, and the effective number of laminated layers were the same as those in EXAMPLE 1.

Sample No. 13

First, a main component powder made of $Ba_{1.01}TiO_3$ was prepared by the same method and procedure as in EXAMPLE 1.

Next, $Nd_2O_3$, NiO, MgO, MnO, and CuO were prepared. Subsequently, predetermined amounts of these compounds were weighed such that the ratio Nd:Ni:Mg:Mn:Cu was 1:0.5:0.75:0.125:0.05, and mixed. A heat treatment was performed at a temperature of 1,000° C. for two hours to prepare a Nd—Ni—Mg—Mn—Cu—O oxide powder.

After the above oxide powder was disintegrated, the main component powder and the oxide powder were weighed such that the amount of oxide powder was 4 parts by mole in terms of Nd relative to 100 parts by mole of the main component powder. The weighed powders were then charged in a ball mill together with PSZ balls and purified water. The powders were sufficiently mixed and ground by a wet process, and then dried to obtain a ceramic raw material.

Thereafter, two types of samples including dielectric ceramic layers having a thickness of 2.0 μm or 1.6 μm were prepared by the same method and procedure as in EXAMPLE 1. The outline dimensions, the area of a counter electrode per dielectric ceramic layer, and the effective number of laminated layers were the same as those in EXAMPLE 1.

Sample No. 14

First, a main component powder made of $Ba_{1.01}TiO_3$ was prepared by the same method and procedure as in EXAMPLE 1.

Next, $Nd_2O_3$, NiO, MgO, and $TiO_2$ were prepared. Subsequently, predetermined amounts of these compounds were weighed such that the ratio Nd:Ni:Mg:Ti was 1:0.25:0.25:0.5, and mixed. A heat treatment was performed at a temperature of 1,000° C. for two hours to prepare a Nd—Ni—Mg—Ti—O oxide powder.

Subsequently, as additive powders, MgO, MnO, $SiO_2$, CuO, and $BaCO_3$ were prepared. After the above oxide powder was disintegrated, the main component powder, the oxide powder, and the additive powders were weighed such that the amount of oxide powder was 4 parts by mole in terms of Nd, the amount of MgO was 2 parts by mole, the amount of MnO was 0.5 parts by mole, the amount of $SiO_2$ was 2 parts by mole, the amount of CuO was 0.2 parts by mole, and the amount of $BaCO_3$ was 2 parts by mole relative to 100 parts by mole of the main component powder. The weighed powders were then charged in a ball mill together with PSZ balls and purified water. The powders were sufficiently mixed and ground by a wet process, and then dried to obtain a ceramic raw material.

Thereafter, two types of samples including dielectric ceramic layers having a thickness of 2.0 μm or 1.6 μm were prepared by the same method and procedure as in EXAMPLE 1. The outline dimensions, the area of a counter electrode per dielectric ceramic layer, and the effective number of laminated layers were the same as those in EXAMPLE 1.

Sample No. 15

First, a main component powder made of $Ba_{1.01}TiO_3$ was prepared by the same method and procedure as in EXAMPLE 1.

Next, $Nd_2O_3$, NiO, and $SiO_2$ were prepared. Subsequently, predetermined amounts of these compounds were weighed such that the ratio Nd:Ni:Si was 1:0.5:0.5, and mixed. A heat treatment was performed at a temperature of 1,000° C. for two hours to prepare a Nd—Ni—Si—O oxide powder.

Subsequently, as additive powders, MgO, MnO, and CuO were prepared. After the above oxide powder was disintegrated, the main component powder, the oxide powder, and the additive powders were weighed such that the amount of oxide powder was 4 parts by mole in terms of Nd, the amount of MgO was 3 parts by mole, the amount of MnO was 0.5 parts by mole, and the amount of CuO was 0.2 parts by mole relative to 100 parts by mole of the main component powder. The weighed powders were then charged in a ball mill together with PSZ balls and purified water. The powders were sufficiently mixed and ground by a wet process, and then dried to obtain a ceramic raw material.

Thereafter, two types of samples including dielectric ceramic layers having a thickness of 2.0 μm or 1.6 μm were prepared by the same method and procedure as in EXAMPLE 1. The outline dimensions, the area of a counter electrode per dielectric ceramic layer, and the effective number of laminated layers were the same as those in EXAMPLE 1.

Next, for each of Sample Nos. 11 to 15, the crystalline compound oxide was identified, and the molar ratio Ni/(Ni+ Mg) of Ni to the total of Ni and Mg was calculated by the same method and procedure as in EXAMPLE 1.

Next, a high-temperature load test was performed by applying a voltage of 32 V at a temperature of 125° C. for 1,000 hours to the two types of samples, more specifically, 100 samples including dielectric ceramic layers each having a thickness of 2.0 μm and 100 samples including dielectric ceramic layers each having a thickness of 1.6 μm. The generation rates of defects were determined.

Table 2 shows the composition of the main component, the presence or absence of a crystalline compound oxide, the molar ratio Ni/(Ni+Mg), and the measurement results of the high-temperature load test of Sample Nos. 11 to 15.

TABLE 2

| Sample No. | Composition of main component: $Ba_{1.01}TiO_3$ | | High-temperature load test: Generation rate of defects (%) | |
|---|---|---|---|---|
| | Presence or absence of crystalline compound oxide | Molar ratio Ni/(Ni + Mg) (—) | Electric field strength: 16 kV/mm | Electric field strength: 20 kV/mm |
| 11 | Present | 0.3 | 0 | 3 |
| 12 | Present | 0.8 | 0 | 0 |
| 13 | Present | 0.3 | 0 | 5 |
| 14 | Present | 0.5 | 0 | 2 |
| 15* | Absent | — | 10 | 25 |

Symbol * represents that the sample is out of the range of the present invention.

In Sample No. 15, the presence of a Nd—Ni—Ti—O crystalline compound oxide was not observed. The generation rate of defects was 10% at an electric field strength of 16 kV/mm, and the generation rate of defects was 25% at an electric field strength of 20 kV/mm. It was found that reliability was poor. The reason for this is believed to be as follows. Since an oxide powder containing both R and Si was added to the main component powder, the taking of Ti contained in the main component powder into the crystalline compound oxide was inhibited. As a result, although the molar ratio Ni/Nd was 0.5, a crystalline compound oxide containing Nd, Ni, and Ti as main components was not formed in the dielectric ceramic.

In Sample No. 11, a Nd—Ni—O oxide powder was prepared in advance such that the molar ratio Ni/Nd was 0.25, and NiO was further added thereto. In Sample No. 11, the presence of a Nd—Ni—Ti—O crystalline compound oxide was observed. As a result, the generation rate of defects was 0% at an electric field strength of 16 kV/mm, and the generation rate of defects was 3% even at an electric field strength of 20 kV/mm. It was found that satisfactory reliability was obtained. The reason why some defective products were generated at an electric field strength of 20 kV/mm is that the molar ratio Ni/(Ni+Mg) was 0.3, and thus the molar content of Mg in the crystalline compound oxide was relatively larger than that of Ni.

In Sample No. 12, since a Nd—Ni—Ti—O oxide powder was added to the main component powder, a crystalline compound oxide composed of $Nd_2NiTiO_6$ could be easily produced. It was found that, accordingly, the generation rate of defects could be 0% even at an electric field strength of 20 kV/mm, and high reliability could be obtained.

In Sample No. 13, a Nd—Ni—Mg—Mn—Cu—O oxide powder was added to a main component powder, and the presence of a Nd—Ni—Ti—O crystalline compound oxide was observed. As a result, the generation rate of defects was 0% at an electric field strength of 16 kV/mm, and the generation rate of defects was 5% even at an electric field strength of 20 kV/mm. It was found that satisfactory reliability was obtained. The reason why some defective products were generated at an electric field strength of 20 kV/mm is believed that, as in Sample No. 11, the molar ratio Ni/(Ni+Mg) was 0.3, and thus the molar content of Mg in the crystalline compound oxide was relatively larger than that of Ni.

In Sample No. 14, the presence of a Nd—Ni—Ti—O crystalline compound oxide was observed. As a result, the generation rate of defects was 0% at an electric field strength of 16 kV/mm, and the generation rate of defects was 2% even at an electric field strength of 20 kV/mm. It was found that satisfactory reliability was obtained. The reason why some defective products were generated at an electric field strength of 20 kV/mm is believed to be as follows. The molar ratio Ni/(Ni+Mg) was 0.5, and accordingly, the molar content of Mg in the crystalline compound oxide was substantially the same as that of Ni. Consequently, the ratio of Ni in the crystalline compound oxide decreased.

EXAMPLE 3

Sample Nos. 21 to 37

First, as ceramic primary raw materials, predetermined amounts of $BaCO_3$, $CaCO_3$, $SrCO_3$, and $TiO_2$ were weighed, and the weighed primary raw materials were charged in a ball mill together with PSZ balls and purified water. The primary raw materials were sufficiently mixed and ground by a wet process, and then dried. Subsequently, the resulting powder was calcined at a temperature of 1,100° C. for about two hours. Thereby, a main component powder made of $(Ba_{0.985}Ca_{0.012}Sr_{0.003})_{1.002}TiO_3$ having an average particle diameter of 0.15 μm was prepared.

Next, various types of rare earth oxides $R_2O_3$ containing a rare earth element R (wherein R is Y, La, Ce, Pr, Nd, Sm, Eu, Gd, Tb, Dy, Ho, Er, Tm, Yb, and Lu) were prepared.

Next, the $R_2O_3$ and NiO were weighed such that the molar ratio Ni/R of Ni to R was 0.5 and mixed. A heat treatment was performed at a temperature of 1,000° C. for two hours to prepare a crystalline oxide powder represented by R—Ni—O.

Subsequently, MgO, MnO, $SiO_2$, and CuO were prepared as additive powders. The main component powder, the oxide powder, and the additive powders were weighed such that the amount of oxide powder was 4 parts by mole in terms of R, the amount of MgO was 3 parts by mole, the amount of MnO was 0.5 parts by mole, the amount of $SiO_2$ was 2 parts by mole, and the amount of CuO was 0.2 parts by mole relative to 100 parts by mole of the main component powder. The weighed powders were then charged in a ball mill together with PSZ balls and purified water. The powders were sufficiently mixed and ground by a wet process, and then dried to obtain a ceramic raw material.

Thereafter, two types of samples including dielectric ceramic layers having a thickness of 2.0 μm or 1.6 μm were prepared as Sample Nos. 21 to 37 by the same method and procedure as in EXAMPLE 1.

The outline dimensions, the area of a counter electrode per dielectric ceramic layer, and the effective number of laminated layers of Sample Nos. 21 to 37 were the same as those in [EXAMPLE 1].

Sample Nos. 38 to 52

First, a main component powder made of $(Ba_{0.985}Ca_{0.012}Sr_{0.003})_{1.002}TiO_3$ was prepared by the same method and procedure as in Sample Nos. 21 to 37.

Next, the main component powder, an oxide powder, and additive powders were weighed such that the amount of $R_2O_3$ was 2 parts by mole, the amount of NiO was 2 parts by mole, the amount of MgO was 3 parts by mole, the amount of MnO was 0.5 parts by mole, the amount of $SiO_2$ was 2 parts by mole, and the amount of CuO was 0.2 parts by mole relative to 100 parts by mole of the main component powder. The weighed powders were then charged in a ball mill together with PSZ balls and purified water. The powders were sufficiently mixed and ground by a wet process, and then dried to obtain a ceramic raw material.

Thereafter, two types of samples including dielectric ceramic layers having a thickness of 1.6 μm or 2.0 μm were prepared as Nos. 38 to 52 by the same method and procedure as in EXAMPLE 1.

The outline dimensions, the area of a counter electrode per dielectric ceramic layer, and the effective number of laminated layers of Sample Nos. 38 to 52 were the same as those in EXAMPLE 1.

Characteristic Evaluation

Next, for each of Sample Nos. 21 to 52, the crystalline compound oxide was identified by the same method and procedure as in EXAMPLE 1, and furthermore, the molar ratio Ni/(Ni+Mg) of Ni to the total of Ni and Mg was calculated.

Subsequently, a high-temperature load test was performed by applying a voltage of 32 V at a temperature of 125° C. for 1,000 hours to the two types of samples, more specifically, 100 samples including dielectric ceramic layers each having a thickness of 2.0 μm and 100 samples including dielectric ceramic layers each having a thickness of 1.6 μm. The generation rates of defects were determined.

Table 3 shows the composition of the main component, the molar ratio Ni/R, the presence or absence of a crystalline compound oxide, the molar ratio Ni/(Ni+Mg), and the measurement results of the high-temperature load test of Sample Nos. 21 to 52.

TABLE 3

| | Composition of main component: $(Ba_{0.985}Ca_{0.012}Sr_{0.003})_{1.002}TiO_3$ | | | High-temperature load test: Generation rate of defects (%) | |
|---|---|---|---|---|---|
| Sample No. | Molar ratio Ni/R (—) | R | Presence or absence of crystalline compound oxide | Molar ratio Ni/(Ni + Mg) (—) | Electric field strength: 16 kV/mm | Electric field strength: 20 kV/mm |
| 21 | 0.5 | Y | Present | 0.7 | 0 | 0 |
| 22 | 0.5 | La | Present | 0.7 | 0 | 0 |
| 23 | 0.5 | Ce | Present | 0.7 | 0 | 0 |
| 24 | 0.5 | Pr | Present | 0.7 | 0 | 0 |
| 25 | 0.5 | Nd | Present | 0.7 | 0 | 0 |
| 26 | 0.5 | Sm | Present | 0.7 | 0 | 0 |
| 27 | 0.5 | Eu | Present | 0.7 | 0 | 0 |
| 28 | 0.5 | Gd | Present | 0.7 | 0 | 0 |
| 29 | 0.5 | Tb | Present | 0.7 | 0 | 0 |
| 30 | 0.5 | Dy | Present | 0.7 | 0 | 0 |
| 31 | 0.5 | Ho | Present | 0.7 | 0 | 0 |
| 32 | 0.5 | Er | Present | 0.7 | 0 | 0 |
| 33 | 0.5 | Tm | Present | 0.7 | 0 | 0 |
| 34 | 0.5 | Yb | Present | 0.7 | 0 | 0 |
| 35 | 0.5 | Lu | Present | 0.7 | 0 | 0 |
| 36 | 0.5 | Dy/Tm = 0.5/0.5 | Present | 0.7 | 0 | 0 |
| 37 | 0.5 | Nd/Yb = 0.75/0.25 | Present | 0.7 | 0 | 0 |
| 38* | — | Y | Absent | — | 45 | 100 |
| 39* | — | La | Absent | — | 100 | 100 |
| 40* | — | Ce | Absent | — | 91 | 100 |

TABLE 3-continued

| | Composition of main component: $(Ba_{0.985}Ca_{0.012}Sr_{0.003})_{1.002}TiO_3$ | | | High-temperature load test: Generation rate of defects (%) | |
|---|---|---|---|---|---|
| Sample No. | Molar ratio Ni/R (—) | R | Presence or absence of crystalline compound oxide | Molar ratio Ni/(Ni + Mg) (—) | Electric field strength: 16 kV/mm | Electric field strength: 20 kV/mm |
| 41* | — | Pr | Absent | — | 93 | 100 |
| 42* | — | Nd | Absent | — | 80 | 100 |
| 43* | — | Sm | Absent | — | 61 | 100 |
| 44* | — | Eu | Absent | — | 55 | 100 |
| 45* | — | Gd | Absent | — | 52 | 100 |
| 46* | — | Tb | Absent | — | 40 | 100 |
| 47* | — | Dy | Absent | — | 33 | 100 |
| 48* | — | Ho | Absent | — | 38 | 100 |
| 49* | — | Er | Absent | — | 43 | 100 |
| 50* | — | Tm | Absent | — | 34 | 100 |
| 51* | — | Yb | Absent | — | 43 | 100 |
| 52* | — | Lu | Absent | — | 31 | 100 |

Symbol * represents that the sample is out of the range of the present invention.

In Sample Nos. 38 to 52, the generation rate of defects was in the range of 31% to 100% at an electric field strength of 16 kV/mm, and all the samples were defective at an electric field strength of 20 kV/mm. These results show that the samples were far from having high reliability. The reason for this is believed to be that the rare earth element R and Ni were added to the main component powder in the form of $R_2O_3$ and NiO, respectively, together with other additive substances such as MgO, and thus, an R—Ni—Ti—O crystalline compound oxide could not be formed in the dielectric ceramic. Incidentally, when a cross section of each of Sample Nos. 38 to 52 was observed with a scanning electron microscope (SEM), it was confirmed that the additive substances such as $R_2O_3$, NiO, and MgO were present together with $SiO_2$ in an amorphous state in crystal grain boundaries.

In contrast, even when a high electric field of 20 kV/mm was applied under a high-temperature atmosphere of 125° C. for 1,000 hours, no defective products were generated in Sample Nos. 21 to 37. The reason for this is believed to be as follows. An oxide powder (heat-treated powder) containing a rare earth element R and Ni was prepared in advance, and the oxide powder was then added to the main component powder together with other additive substances. Therefore, an R—Ni—Ti—O crystalline compound oxide was present in the resulting dielectric ceramic. In addition, the molar ratio Ni/R was 0.5, which exceeded 0.35, and the molar ratio Ni/(Ni+Mg) was 0.7. Accordingly, the molar content of Mg in the crystalline compound oxide was also low.

The crystal structures of Sample No. 30 and a $Dy_2NiTiO_6$ powder, which was separately prepared, were analyzed with an X-ray diffractometer.

Figure 2:
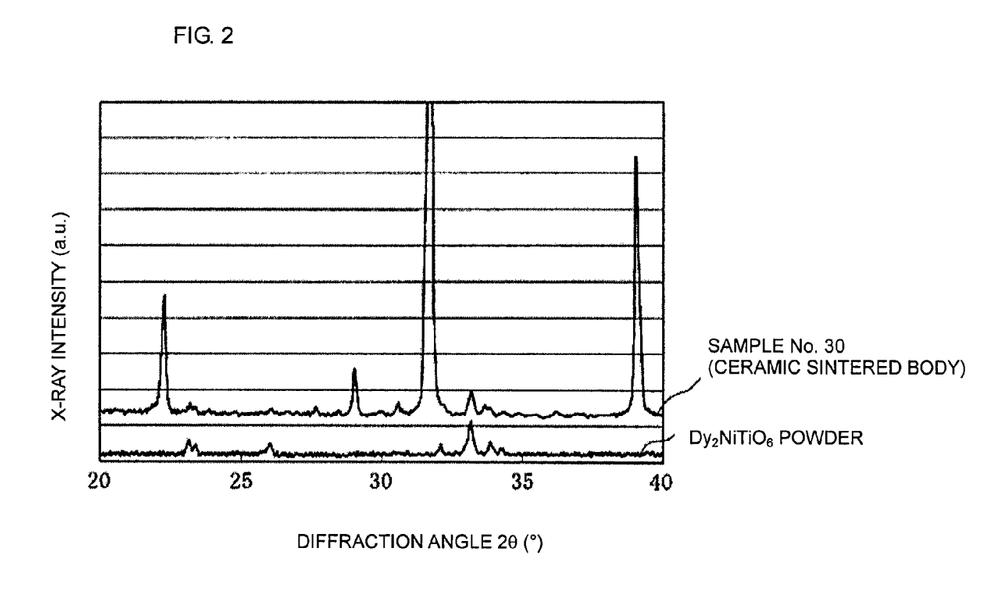
FIG. 2 is an X-ray diffraction chart showing an analysis result of the crystal structure of Sample No. 30 of EXAMPLE 3 together with an analysis result of $Dy_2NiTiO_6$.

FIG. 2 is a graph showing an X-ray diffraction chart thereof. The horizontal axis represents a diffraction angle 2θ (°), and the vertical axis represents an X-ray intensity (a.u.).

As is apparent from FIG. 2, it was found that a crystalline compound oxide having a crystal structure equivalent to that of $Dy_2NiTiO_6$ was present as a secondary phase in the dielectric ceramic (sintered body) of Sample No. 30.

The invention claimed is:

1. A dielectric ceramic comprising a barium titanate compound oxide as a main component; a secondary component which is a crystalline compound oxide containing the rare earth element R, Ni, and Ti as main components; and Mg, wherein R is at least one rare earth element selected from the group consisting of Y, La, Ce, Pr, Nd, Sm, Eu, Gd, Tb, Dy, Ho, Er, Tm, Yb, and Lu.

2. The dielectric ceramic according to claim 1, wherein the ratio Ni/R of the molar content of Ni to the molar content of the rare earth element R in the crystalline compound oxide satisfies the relationship Ni/R>0.15.

3. The dielectric ceramic according to claim 2, wherein the ratio Ni/R satisfies the relationship Ni/R>0.35.

4. The dielectric ceramic according to claim 3, wherein the crystalline compound oxide is represented by a composition formula $R_2NiTiO_6$.

5. The dielectric ceramic according to claim 3, wherein the crystalline compound oxide contains Mg, and the ratio Ni/(Ni+Mg) of the molar content of Ni to the total molar content of Ni and Mg satisfies the relationship Ni/(Ni+Mg)≧0.3.

6. The dielectric ceramic according to claim 5, wherein the ratio Ni/(Ni+Mg) satisfies the relationship Ni/(Ni+Mg)≧0.7.

7. The dielectric ceramic according to claim 6, wherein the crystalline compound oxide is represented by a composition formula $R_2(Ni, Mg)TiO_6$.

8. The dielectric ceramic according to claim 4, wherein the crystalline compound oxide contains Mg, and the ratio Ni/(Ni+Mg) of the molar content of Ni to the total molar content of Ni and Mg satisfies the relationship Ni/(Ni+Mg)≧0.3.

9. The dielectric ceramic according to claim 2, wherein the crystalline compound oxide contains Mg, and the ratio Ni/(Ni+Mg) of the molar content of Ni to the total molar content of Ni and Mg satisfies the relationship Ni/(Ni+Mg)≧0.3.

10. The dielectric ceramic according to claim 1, wherein the crystalline compound oxide contains Mg, and the ratio Ni/(Ni+Mg) of the molar content of Ni to the total molar content of Ni and Mg satisfies the relationship Ni/(Ni+Mg) ≧0.3.

11. The dielectric ceramic according to claim 1, further comprising at least one of MgO, MnO, $SiO_2$ and CuO.

12. A dielectric ceramic comprising a barium titanate compound oxide as a main component; a secondary component which is a crystalline compound oxide containing the rare earth element R, Ni, and Ti as main components; and Mg, wherein R is at least one rare earth element selected from the group consisting of Y, La, Ce, Pr, Nd, Sm, Eu, Gd, Tb, Dy, Ho, Er, Tm, Yb, and Lu, and wherein the barium titanate is a barium, calcium, strontium titanate.

13. A monolithic ceramic capacitor comprising a ceramic sintered body comprising a plurality of dielectric ceramic layers and inner electrode layers, and a pair of outer electrodes each of which is electrically connected to different internal electrode layers, wherein the dielectric ceramic layers comprise the dielectric ceramic according to claim 1.

14. A monolithic ceramic capacitor according to claim 13, in which the crystalline compound oxide is represented by a composition formula $R_2NiTiO_6$ or $R_2(Ni, Mg)TiO_6$.

15. A monolithic ceramic capacitor comprising a ceramic sintered body comprising a plurality of dielectric ceramic layers and inner electrode layers, and a pair of outer electrodes each of which is electrically connected to different internal electrode layers, wherein the dielectric ceramic layers comprise the dielectric ceramic according to claim 2.

16. A monolithic ceramic capacitor comprising a ceramic sintered body comprising a plurality of dielectric ceramic layers and inner electrode layers, and a pair of outer electrodes each of which is electrically connected to different internal electrode layers, wherein the dielectric ceramic layers comprise the dielectric ceramic according to claim 3.

17. A monolithic ceramic capacitor comprising a ceramic sintered body comprising a plurality of dielectric ceramic layers and inner electrode layers, and a pair of outer electrodes each of which is electrically connected to different internal electrode layers, wherein the dielectric ceramic layers comprise the dielectric ceramic according to claim 5.

* * * * *